Patented Feb. 13, 1945

2,369,327

UNITED STATES PATENT OFFICE 2,369,327

CERAMIC PREPARATION

Eugene Wainer, Niagara Falls, N. Y., assignor to The Titanium Alloy Manufacturing Company, New York, N. Y., a corporation of Maine No Drawing. Application May 24, 1941, Serial No. 395,082

4 Claims. (Cl. 106—63)

This invention relates to ceramic materials containing titanium dioxide as the major ingredient, more particularly for use in electrical condensers and similar applications requiring a high dielectric constant and a low power factor. Specifically, the invention relates to compositions for forming ceramic masses containing titanium dioxide, and to methods for forming such compositions into ceramic masses.

In the past few years the importance of the use of large size condensers in many electrical applications has been increasing rapidly. For example, condensers of high kilovolt ampere rating are being advantageously used in the voltage regulation of electrical distribution systems, to raise voltage levels and to increase the width of the existing regulating band, which is particularly important during peak load conditions. Condensers of high capacity are of particular importance in the distribution of power to rural districts. Other uses are in radio transmitting and receiving, telephone and telegraph, condenser type terminals for transformers, auxiliaries for high frequency induction furnaces, coupling carrier-current circuits to power systems, and in power and power distribution systems generally. In all these applications, the measure of a condenser's effectiveness is its ability to store electrical energy for subsequent usage, and the utility of any material as a condenser or dielectric material is measured by the dielectric constant or specific inductive capacity of that material. For example, for two materials fabricated in exactly the same size and shape a material having a dielectric constant of 20 will be roughly ten times as effective a storehouse of electrical energy as a material having a dielectric constant of only 2. Materials most commonly used as dielectrics for condensers are glass, porcelain, resins, mica and similar substances, for the most part having dielectric constants between 3 and 10. In particular, the material usually used on power systems is high grade electrical porcelain having a dielectric constant of 5 to 7. For many of the applications mentioned above, in order to secure the required capacity the structure assumes rather huge proportions due to its relatively low dielectric constant. A material which has a very high dielectric constant is titanium dioxide having the crystalline form of rutile. This material has an average dielectric constant of 114, and in recent ceramic fabrications can be made with a specific inductive capacity or dielectric constant as high as 105 to 110. This means that for the large structures mentioned above, the actual physical size of the condenser, if made of titanium dioxide, could be $\frac{1}{8}$ to $\frac{1}{18}$ of the size of a condenser of similar electrical properties made of electrical porcelain.

Other materials which have valuable dielectric properties are chemical combinations of titanium dioxide with divalent metal oxides, such chemical combinations being known as titanates. Among such useful titanates are those of calcium, strontium, barium, magnesium, beryllium, cadmium, zinc, and divalent lead. These titanates are preferably used in combination with titanium dioxide, but may be used alone or in any desired combination with each other. Combinations of lead titanate and a titanate of an alkaline earth metal (calcium, strontium and barium, and particularly strontium) with titanium dioxide have been found particularly advantageous.

Up to the present, condensers made of titanium dioxide and/or the above titanates have been of very small size, of the order of weight of a fraction of an ounce, and have usually been shaped and formed by application of high mechanical pressures to the powdered material in a suitably shaped mold or die. For the applications listed above, however, structures weighing from a few pounds up to several hundred pounds are used, and the shapes required vary widely from simple plates to pieces of intricate convolution and design. Large pieces of simple design are not suited to pressure methods of forming due to the cost of the forms or dies required, and the extreme difficulty if not impossibility of maintenance of uniform physical structure with this method of forming, such uniformity of structure being of paramount importance in electrical applications. Furthermore, most of the shapes required are of such design or complexity that they cannot be formed by pressure methods due to the presence of aprons, undercuts, varying cross sections, etc., making proper engagement of pressure dies an impossibility.

In the fabrication of ceramic pieces not susceptible to pressure methods of shaping, recourse is invariably made to casting the shape in a suitable mold by the art known to the ceramist as "slip-casting." In this method a water slip of the ceramic material is prepared and cast into plaster of Paris molds of accurate design. Much of the water in the original slip is extracted by the porous plaster, the residual material shrinking slightly as a damp solid from the plaster surface, allowing easy removal of the shape from the mold. By this procedure shapes from a fraction of an ounce up to several hundred pounds may be prepared of every conceivable size, shape, under-cutting, etc. Besides this available flexibility of shape and form, the texture of the finished shape is highly uniform and compact. In order for a slip to be susceptible to casting it must have highly specialized properties, usually denoted by the ceramic terms "deflocculation" and "plasticity." These properties are usually imparted by the addition of substantial quantities of clay of which certain types possess these properties to a marked degree. A major drawback to the use of clay, however, is that not only are the main constituents of clay to a certain degree deleterious to the electrical properties (dielectric constant, power factor, etc.) of the ceramic, but almost invariably clays contain highly harmful impurities from the standpoint of a condenser body, such as iron, chromium, vanadium, etc. The harmful nature of these and other elements is fully described in copending application Serial No. 270,462, filed April 27, 1939, now U. S. Patent No. 2,277,733. Thus to obtain the best electrical results clays should be eliminated entirely in the fabrication of titanium dioxide electrical bodies.

It is therefore an object of this invention to prepare ceramic materials, containing principally titanium dioxide or divalent metal titanates, by slip casting methods. It is another object to prepare such ceramic materials relatively free from harmful impurities, and suitable for electrical applications. It is a further object to provide novel means for imparting the necessary plastic and deflocculative properties to water slips containing principally titanium oxide alone, or titanium oxide plus the aforementioned titanates, or these titanates alone, so as to make them completely suitable for formation into physical structures by slip casting in plaster of Paris or similar molds. A still further object is to provide titanium dioxide or divalent metal titanate compositions suitable for casting by slip casting procedures. Other objects will appear hereinafter.

These objects are accomplished by incorporating in a titanium dioxide or divalent metal titanate composition a small amount of a colloid peptizable in water and a small amount of a monobasic alkaline material giving in water an OH— ion concentration of at least $1.0 \times 10^{-5}$, that is, having a pH of at least 9. In accordance with one form of this invention, certain substances have been found which combine both these characteristics, that is, they give an OH— concentration of at least $1.0 \times 10^{-5}$, and they are also colloids peptizable in water, or form such colloids in water containing normal impurities.

By colloids or colloidal material is meant that class of material first described on a scientific basis by Graham in 1861. The colloids which are useful in the practice of the present invention are those forming true sols in water, or in other words are more or less completely dispersible or peptizable in water and do not include colloids not peptized by water. Generally these materials include gels and gel forming materials and are further characterized by slow diffusibility in water, are usually non-crystalline or sometimes gelatinous, have huge apparent molecular weights of such size as to be ultra-microscopically visible, and are non-electrolytes. Only those colloids of this description which are very slightly basic, neutral, or very slightly acid in the hydro-dispersed form may be used in the present invention. In addition, while the above classification will include both inorganic and organic materials, it is preferred to use organic materials, with the exceptions noted below. Finally, while these materials are here characterized by the term "colloidal" and its usual connotations, in the last analysis the determining factor for utility is the huge true or apparent molecular weight of these substances in water and may be conceivably exhibited by truly water soluble materials of huge molecular weight. Since water solutions of such materials normally exhibit properties shown by colloidal systems generally, the distinction as to utility for this specification is based on true or apparent molecular weight as exhibited by the characteristic water dispersible unit or micelle. As stated above, this characteristic may apply to both inorganic and organic materials. However, in preparing inorganic sols of colloidal nature, some electrolyte is normally used for peptization purposes and is very difficult to remove. The electrolytes used are usually of such nature as to destroy the desirable working characteristics of the slip, and it is chiefly for this reason that inorganic sols are not preferred. Furthermore, inorganic sols will remain in the fired body, and if they contain undesirable cations and are present in a substantial amount, may hinder the obtention of desirable electrical characteristics in the finished product.

Organic colloidal materials whose characteristics have been described and which are useful in the practice of the present invention may be partially listed as follows: corn starch, root starch, starches generally, dextrin, albumin, serum albumin, blood serum, tannins, tannic acid, gelatine, glue, agar agar, alginic acid, kelp extracts, humus and compost extracts, extracts of decayed leaves, some proteins, molasses, gums such as arabic and tragacanth, pectins, glycogens, etc. Inorganic materials which do not have the defects noted above are certain pyrophosphates of sodium or other alkali metal of formulae ranging from $Na_4P_2O_7$ to $Na_6P_4O_{13}$ in combination with minute amounts of calcium. Since practically all potable waters contain sufficient amounts of lime the simple addition of the pyrophosphate of sodium is sufficient. It is now known that the addition of these pyrophosphates to water containing a minute amount of lime forms an addition compound between the two materials thus removing the lime from solution. This addition compound grows in size very rapidly, so that the unit or micelle eventually formed exhibits the properties of the colloidal state, indicating the huge molecular size finally reached. Amounts of calcium ion above that required to form the addition compound are to be avoided, since the desirable deflocculating effect is destroyed by shifting the chemical equilibrium.

In addition to the colloid or colloidal material of the nature described, there is incorporated in the titanium dioxide composition a small amount of a water soluble monobasic alkaline material whose dissociation constant for the OH— ion is equal to or larger than $1.0 \times 10^{-5}$, or whose pH is at least 9. Such materials are the alkali hydroxides, ammonium hydroxides, members taken from the class of simple and substituted alkyl amines which in some cases may be primary, secondary, or tertiary or mixed, the substituted amines known as "onium" or "oxonium" compounds such as ethyl or methyl ammonium hydroxide, and certain heterocyclic aromatic compounds such as piperidine. Materials in the above groups which are water soluble, mono-basic, and whose OH— ion formation in water has a dissociation constant equal to or larger than $1.0 \times 10^{-5}$ are of utility for the purposes of this invention. In the case of the sodium pyrophosphates referred to above, since they yield OH— ions in water solutions in the amounts specified, it is unnecessary to make further additions of alkaline materials.

For those types of condenser applications where exceptionally high resistance to puncture or flashover is not required, or where the operation is at relatively low voltage and in lower frequency ranges the type of alkaline material used is immaterial and the fixed alkalis or sodium pyrophosphate will serve, particularly since they are added in such minute quantities. However, in those applications where high resistance to flashover and puncture is required, where operating voltages are high and where frequency levels are high, particularly in the radio frequency range, and a low loss factor is essential, it is necessary that as much of the fixed alkalis such as sodium and potassium as possible be eliminated, since these not only contribute to failure under the above operating conditions but tend to raise power factors at high frequencies to the point where the condenser tends to become inoperative. In these cases the required base is supplied entirely by ammonia or the completely organic bases.

The quantities of these materials which are incorporated with the titanium dioxide or metal titanate are quite small. Thus 0.005 to 0.5 part of the colloidal material, and 0.005 to 0.5 part of the alkaline material or base, per 100 parts of titanium dioxide or metal titanate are suitable. In the case of the sodium pyrophosphates, 0.005 to 0.5 part of such material per 100 parts of titanium dioxide or metal titanate may be used. By varying the amounts of the active materials relative to each other and also relative to the major constituents of the slip, slips with widely varying characteristics over the usable range may be prepared. For example, the higher the amount of the combined agents relative to the titanium oxide or metal titanate up to a certain limit the slower the absorption of water by the plaster, the denser the finished piece, and the thinner the final wall section. By decreasing the alkali towards its lowest limit of activity and increasing the colloid amount to its median level of activity the more rapid absorptions of water by the plaster are obtained, and heavier wall sections can be formed with little or no sacrifice in density. By decreasing the colloidal material in amount towards its lower limit of activity and increasing the base to its median level of activity relative to quantity, rapidly formed pieces of heavy cross section and relatively lower density can be obtained.

In the practice of this invention, water is mixed with titanium oxide or titanium oxide plus one or more titanates of divalent metals or such titanates alone, together with a minor quantity of a water dispersible colloid as described above and a minor quantity of a water solution of a basic material as described above. The ingredients are mixed together in any desired order. On thorough mixing a completely deflocculated and plastic slip is obtained suitable for slip casting in plaster molds. The amount of water required to secure a slip of suitable characteristics varies with the nature and physical condition of the titanium dioxide or other principal ingredient. Thus for the material commercially known as heavy grade titanium dioxide (prepared by calcination of pigment grade titanium dioxide at temperatures around 1350° C.), about 20 to 22 cc. of water per 100 grams of titanium dioxide is used. For natural rutile ground to pass a 325 mesh screen, 16 to 17 cc. of water per 100 grams of rutile is used. For finer millings, larger quantities of water are required.

After the slip is prepared, it is poured into plaster or similar molds, dried, removed from the mold, and fired in the manner customary in the ceramic art, and particularly as described in copending application Serial No. 270,462, filed April 27, 1939.

The invention having been described generally, the following examples are now given describing specific modes of practicing the invention. In all these examples, the compositions are mixed thoroughly, cast into plaster molds, dried, removed from the molds, and fired as is customary in the ceramic art.

*Example 1*

For ware of relatively heavy wall or cross section and for rapid forming:

| | Grams |
|---|---|
| Heavy grade $TiO_2$ | 1,000 |
| $Na_4P_2O_7$ | 0.2 |
| Water | 215 |

*Example 2*

For ware of high body density, thin wall or of small cross section and slow forming:

| | Grams |
|---|---|
| Heavy grade $TiO_2$ | 1,000 |
| $Na_4P_2O_7$ | 1.0 |
| Water | 200 |

*Example 3*

| | Grams |
|---|---|
| A prefired titanate of a divalent metal such as Be, Mg, Ca, Sr, Ba or mixtures thereof | 100 |
| Heavy grade $TiO_2$ | 900 |
| $Na_4P_2O_7$ | 0.5 |
| Water | 210 |

*Example 4*

| | Grams |
|---|---|
| One of the titanates of Example 3 or mixtures thereof | 80 |
| Lead titanate | 20 |
| Heavy grade $TiO_2$ | 900 |
| $Na_4P_2O_7$ | 0.5 |

*Example 5*

| | Grams |
|---|---|
| One of the titanates of Example 3 such as strontium titanate | 1,000 |
| $Na_4P_2O_7$ | 0.6 |
| Water | 180 |

*Example 6*

| | Grams |
|---|---|
| 325 mesh pure natural rutile | 1,000 |
| $Na_4P_2O_7$ | 0.3 |
| Water | 165 |

*Example 7*

For heavy wall or thick section:

| | Grams |
|---|---|
| Heavy grade $TiO_2$ | 1,000 |
| NaOH or KOH | 0.2 |
| Tannin, or tannic acid, or glue, or agar agar, or alginic acid, or gum arabic | 0.2 |
| Water | 215 |

Example 8

For thin wall or small section:

| | Grams |
|---|---|
| Heavy grade TiO₂ | 1,000 |
| NaOH or KOH | 0.4 |
| A colloid as in Example 7 | 0.6 |
| Water | 205 |

Example 9

| | Grams |
|---|---|
| One of the titanates of Example 3 or mixtures thereof | 100 |
| Heavy grade TiO₂ | 900 |
| NaOH or KOH | 0.5 |
| A colloid as in Example 7 | 0.5 |
| Water | 215 |

Example 10

| | Grams |
|---|---|
| One of the titanates of Example 3 or mixtures thereof | 80 |
| Lead titanate | 20 |
| Heavy grade TiO₂ | 900 |
| NaOH or KOH | 0.5 |
| A colloid as in Example 7 | 0.5 |
| Water | 215 |

Example 11

| | Grams |
|---|---|
| One of the titanates of Example 3 or mixtures thereof | 1,000 |
| NaOH or KOH | 0.4 |
| A colloid as in Example 7 | 0.6 |
| Water | 180 |

Example 12

| | Grams |
|---|---|
| −325 mesh pure natural rutile | 1,000 |
| NaOH or KOH | 0.3 |
| A colloid as in Example 7 | 0.3 |
| Water | 170 |

Example 13

Same as Examples 7, 8, 9, 10, 11 or 12 except substitute NH₄OH for NaOH or KOH. Compositions of this type are best suited for high frequency low loss applications.

When the titanates of the divalent metals calcium, strontium, barium, magnesium, beryllium, cadmium, zinc or divalent lead are used, either alone or with titanium oxide, as the ceramic base, it is quite important that prefired materials be used. If the raw oxides or carbonates of the above divalent metals (which react at firing temperatures with the titanium dioxide to form the corresponding titanates) are added to the casting slip in the necessary amounts, the desirable plastic and deflocculative properties imparted to the slip by the other ingredients are completely destroyed. On the other hand, when the completely reacted and prefired titanates are present in the slip, the present invention is completely applicable and useful, even when high percentages of these titanates are present.

Of course it is to be understood that some of these titanates are of inferior utility, either alone or mixed with titanium dioxide, when used for dielectric purposes. Thus the presence of magnesium titanate or beryllium titanate in titanium dioxide ceramic masses generally have dielectric characteristics inferior to the same bodies without magnesium or beryllium titanate. On the other hand, use of others of these titanates is highly advantageous, either alone or mixed with titanium dioxide. However, the use of these titanates per se is not claimed in the present application.

When parts are mentioned, parts by weight are understood.

As many modifications may be made within the spirit of this invention, it is not intended to be limited except as defined by the appended claims.

I claim:

1. A composition for forming ceramic masses by slip casting procedures, containing a major proportion of a material taken from the class consisting of titanium dioxide and titanates of the divalent metals calcium, strontium, barium, magnesium, beryllium, cadmium, zinc and divalent lead, and 0.005 to 0.5% of an alkali metal pyrophosphate having a formula between $M_4P_2O_7$ and $M_6P_4O_{13}$, where M represents an alkali metal.

2. A composition for forming ceramic masses by slip casting procedures, containing a major proportion of a material taken from the class consisting of titanium dioxide and titanates of the divalent metals calcium, strontium, barium, magnesium, berryllium, cadmium, zinc and divalent lead, and 0.005 to 0.5% of sodium pyrophosphate having a formula between $Na_4P_2O_7$ and $Na_6P_4O_{13}$.

3. A composition for forming ceramic masses by slip casting procedures, containing a major proportion of titanium dioxide, and 0.005 to 0.5% of an alkali metal pyrophosphate having a formula between $M_4P_2O_7$ and $M_6P_4O_{13}$, where M represents an alkali metal.

4. A composition for forming ceramic masses by slip casting procedures, containing a major proportion of titanium dioxide, and 0.005 to 0.5% of sodium pyrophosphate having a formula between $Na_4P_2O_7$ and $Na_6P_4O_{13}$.

EUGENE WAINER.